United States Patent [19]

Williams et al.

[11] 3,926,562

[45] Dec. 16, 1975

[54] VERTICAL TUBE COMBUSTION REACTOR

[75] Inventors: Frederick W. Williams, Oxon Hill; Ronald S. Sheinson, Silver Spring, both of Md.

[73] Assignee: The United States of America as represented by the Secretary of the Navy, Washington, D.C.

[22] Filed: Aug. 23, 1974

[21] Appl. No.: 500,208

Related U.S. Application Data

[63] Continuation-in-part of Ser. No. 287,328, Sept. 8, 1972, abandoned.

[52] U.S. Cl. ........ 23/253 PC; 23/230 PC; 219/543; 431/170
[51] Int. Cl.² ................ G01N 31/12; H05B 1/00; F23D 21/00
[58] Field of Search ................ 23/253 PC, 230 PC; 219/543, 301; 431/170

[56] References Cited
UNITED STATES PATENTS

| | | | |
|---|---|---|---|
| 3,092,704 | 6/1963 | Woody et al. | 219/301 |
| 3,235,336 | 2/1966 | Matsuyama | 23/253 PC |
| 3,463,613 | 8/1969 | Fenske et al. | 23/253 PC |
| 3,574,549 | 4/1971 | Eggertson | 23/253 PC |
| 3,667,914 | 6/1972 | Penquite | 23/253 PC |
| 3,791,936 | 2/1974 | Pebler et al. | 23/253 PC |
| 3,811,839 | 5/1974 | Pietro et al. | 23/253 PC |

OTHER PUBLICATIONS

ASTM, Standard method of test for flammability of plastics using the Oxygen Index Method, May 8, 1970, ASTM Designation: D2863–D2870 pp. 719–722.
Corning Glass Works, May 8, Pyrex Brand E–C Coated Tubes for Laboratory Heating Jackets, Corning, New York, June 9, 1961, pp. 1–7.
Williams K. G. et al., The Vertical Tube Reactor – a tool for study of flame processes; The Seventh Symposium (international) on combustion Aug. 28–Sept. 3, 1958, Butterworths Scientific Publications 88 Kingsway; London.

*Primary Examiner*—Morris O. Wolk
*Assistant Examiner*—Dale Lovercheck
*Attorney, Agent, or Firm*—R. S. Sciascia; Arthur L. Branning; Thomas McDonnell

[57] ABSTRACT

A vertical tube reactor for analyzing combustion in which the controllable electrically heated reactor tube with optional opposing side ports is sealed to an outer transparent jacket having ports optically aligned therewith, has an optionally heated chimney, and has a lower port suitable for introducing reactants, sensors, and dopants therein.

12 Claims, 2 Drawing Figures

U.S. Patent   Dec. 16, 1975   3,926,562
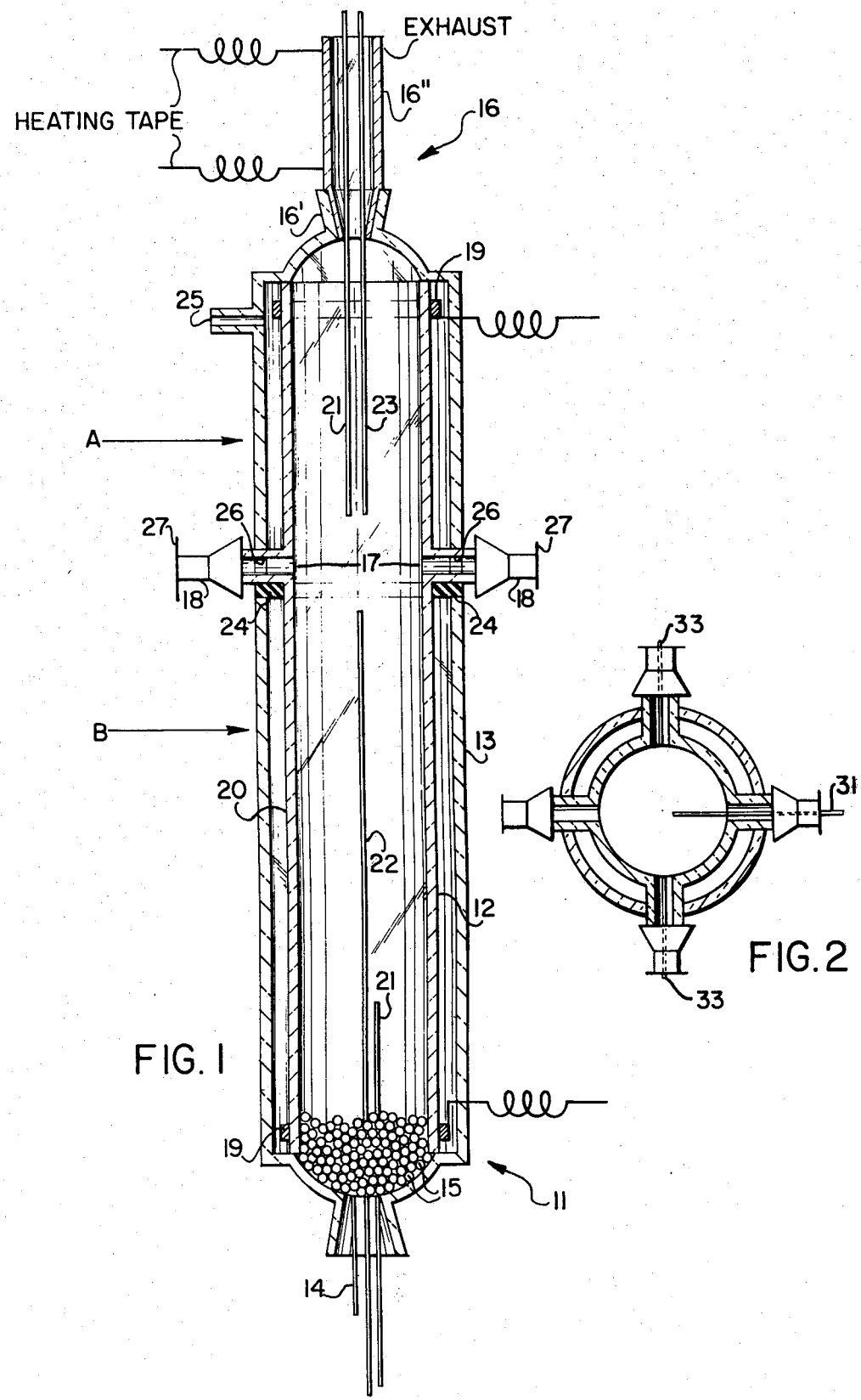

VERTICAL TUBE COMBUSTION REACTOR

BACKGROUND OF THE INVENTION

This application is a continuation-in-part of application Ser. No. 287,328 filed Sept. 8, 1972, and now abandoned.

In recent years the importance of studying the chemical reactants occurring during combustion has greatly increased. It is felt that research in this area may lead to new energy sources, new methods to combat fires and new techniques to reduce or eliminate air pollution.

The study of combustion reactions is usually undertaken in reactors known as flat flame burners. These burners, however, have many drawbacks. The first is that the various flame stages are not spacially separated enough to study the individual reactions occurring. The flame stages, looking similar to archedshaped pancakes, are separated only by a few millimeters. Consequently, it is difficult to isolate the stages and the various reactions occurring in those stages. Also, when viewing the combustion from the side of the burner, all of the stages can be seen instead of just one because of their being arched-shaped. Therefore, it is difficult to make spectroscopic measurements of only one flame stage.

Another disadvantage of the flat flame burner is its lack of temporal stability. The location of the various flame stages is dependent on temperature. After short periods of time the bottom of the burner gets very hot due to the continuing emission of heat from the heat source. This causes the temperature profile within the burner to change, which in turn causes a shift in the location of the flame stages. Any measurements taken must be made before the flame stages shift.

A related problem is that a particular flame stage cannot be located at a predetermined spot within the burner. Consequently, research instruments must be set according to the location of the stage. When the stage moves due to heat loss or gain, the instruments must be moved accordingly.

Another drawback of the flat flame burner is the narrow range of pressures at which it can be operated. It is therefore, difficult to determine the effects of a change of pressure during combustion.

Still another drawback is that dopants can be added only at the bottom of the burner. Many of these dopants decompose before they reach the stage desired. It is not possible to add these dopants to a particular flame stage without partial decomposition.

OBJECTS OF THE INVENTION

It is therefore, an object of the invention to provide a novel reactor useful for studying the chemical reactions occurring during combustion.

It is another object of the invention to provide a reactor useful in the study of oxidation and decomposition of various materials.

It is also an object of this invention to provide a vertical tube reactor which can maintain a linear temperature profile over much of its length.

Another object of this invention is to provide a vertical tube reactor which is capable of producing an almost unlimited spacial resolution of the various flame stages.

And another object of this invention is to provide a vertical tube reactor which can spacially stabilize the oxidation stages of cool flame combustion to within 0.5 mm over an 8-hour period.

A further object is to provide a reactor in which the temperature profile within the reactor is controlled.

A further object is to provide a vertical tube reactor in which combustion may be analyzed at a vacuum as low as about 1 mm or at a pressure over 1 atm.

A still further object is to provide an apparatus which allows spectroscopic studies over the entire light spectrum, ultraviolet through infrared.

And another object is to provide an apparatus which permits absorption spectroscopic studies.

Yet another object is to provide means by which dopants can be added to a particular flame stage without having to pass through other stages.

These and other objects are achieved by analyzing the process of combustion with a transparent vertical tube reactor in which the reactor tube is controllably heated by the passage of electricity through the electrically resistive coating thereon; the reactor tube is sealed to a larger concentric transparent jacket so that the space therebetween may be placed under pressure or a vacuum; the reactor tube has an optionally heated chimney thereby diminishing the effects of end drafts and heat loss; the lower opening of the reactor tube is suitable for introducing reactants, sensors, and dopants; and the reactor tube has a quantity of inert beads or porous material at the lower end so that laminar flow is enhanced and flashbacks are prevented.

BRIEF DESCRIPTION OF THE DRAWING

FIG. 1 illustrates a cross-sectional view of the novel reactor.

FIG. 2 illustrates a top cross-sectional view of the novel reactor with four ports.

DETAILED DESCRIPTION OF THE DRAWING

The novel apparatus comprises a vertical reactor 11. The invention, illustrated in the FIG. 1, is a hollow transparent cylinder, 12, sealingly engaged within a transparent outer jacket, 13. The cylinder, 12, is the actual reactor tube of the vertical reactor. The outer jacket is made up of two parts, A and B, connected by an elastic seal, 24, which acts as an expansion joint. The outer jacket may be divided at any point along its length in order to put in the expansion joint. Also, situated at some point along the length of the outer jacket, is an opening, 25, which allows the cavity between the cylinder and jacket to be placed under a pressure or a vacuum. The cylinder and jacket are made of any transparent insulating material. Glass such as quartz or borosilicate glass compositions are often used. At the lower end of the cylinder is an opening, 14, through which the reactants and a buffer gas or buffer gases, e.g. nitrogen and helium are introduced. By buffer gas it is meant an inert diluent. Such a gas is added to modify the reaction rate and to study the effect of the concentration of reactants on combustion. Just above the inlet is a plurality of glass beads, 15, or a quantity of another porous inert material, placed on top of an inert retaining means, such as a wire screen. At the upper end of the cylinder is another opening, 16. Preferably a heated chimney, 16", is placed within the outlet 16' to prevent any significant temperature change. The chimney is preferably attached to the cylinder by standard taper ground glass joints.

The cylinder may be fitted with viewing ports, 17. Extending from these ports to and beyond the corresponding ports of the outer jacket are sidearms, 26. The sidearms have sealed connections with the cylinder and the outer jacket. Only one of these connections can be inelastic because of the difference in expansion in the jacket and cylinder during combustion. The elastic junction would preferably be with the cooler outer jacket. Any suitable elastic material, e.g., silicone rubber may be used to seal the sidearm to the outer jacket. The two sidearms are thus on opposite sides of the reactor and colinear with each other.

Sidearm windows, 18, are connected to the sidearms. Preferably the two are connected by standard ground glass joints. A variety of sidearm windows are encompassed by the present invention. The optical plate, 27, of the sidearm windows may be composed of a large number of materials. The choice of material would depend on the experiment contemplated. For example, quartz would be used for spectroscopic studies from the UV to the near IR, whereas sapphire would allow studies over a wider band. For a spectroscopic study over the entire IR band, an inorganic salt, e.g. NaCl would be used. The angle of the optical plate with the optical path may be varied for certain experiments. Also the optical windows may have attachments, which may be probes for adding or extracting material or may be electrodes.

In order to perform Raman spectroscopic or laser fluorescence spectroscopic studies, a third window assembly, i.e., port, sidearm, sidearm window which is perpendicular to and on the same level as the axis of the first two window assemblies is necessary. A fourth window assembly directly opposite of the third one may be added in order to facilitate the alignment of the Raman and laser fluorescence spectroscopy optics. These ports are shown in FIG. 2. Also shown in FIG. 2 are a probe for adding and extracting material, 31, and electrodes, 33.

The reactor tube has an electrically resistive coating, 20, which is usually a metallic oxide, e.g., stannous oxide. The resistive coating extends continuously from and between the electrical contacts, 19, which may be silver print paint, metallic bands, and the like. In order to ensure maximum contact between the contacts and the coating and uniform conductance over the entire surface of the tube, the contacts should completely encircle the reactor tube. The contacts are connected to an electrical energy source, not shown.

Thermocouples, 21, are provided to determine the temperature within the cylinder. The lower thermocouple is connected to a control device (not shown) so that the proper temperature profile can be maintained.

FIG. 1 also shows probes 22 and 23 which can be used to add material or remove material from the cylinder.

The reactor operates in the following manner. The outer jacket, 13, is either placed under vacuum or filled with various gases. The cylinder is then subjected to the desired pressure by either attaching the exhaust of the reactor tube to a vacuum pump or by restricting the exhaust. Permissible pressure ranges can vary from 1 mm mercury to well above 1 atm. The upper limit is determined by the strength of the equipment. Fuel along with nitrogen and oxygen is then introduced into the reactor through inlet 14. The reactor is heated to ignite the mixture via spontaneous ignition. As the gases flow up the cylinder they absorb energy and their temperature increases. Since the flame stages occur at specific temperatures, the amount of heat supplied by the coating, 20, can be adjusted by varying the amount of current passing through the coating so that a particular stage is located at a given height in the cylinder. This also permits the setting of a specific stage adjacent the ports 17.

A specific temperature gradient is determined by the combination of the rate of heating produced by the coating on the cylinder, the specific heat coefficient of the reactant mixture, the gas flow rate, and the composition and pressure of the gas within the cavity between the cylinder and the outer jacket. The temperature gradient controls the amount of separation. A small gradient would give a large separation and correspondingly a large gradient would produce a small separation. Since the gradient is less sensitive than the temperatures occurring in the cylinder, the flame stages can be moved over an appreciable distance, e.g., up to one-fourth of the cylinder by small changes in the reactor heating rate, while preserving the spacial relationship between flame stages.

Through the use of the thermocouple 21, any change in temperature is detected and the amount of heat supplied readjusted in order to maintain the proper temperature profile indefinitely. By using this technique, a cool flame stage of a mixture of normal butane (15%), oxygen (15%), and nitrogen (70%) was held within ± 0.5 mm over an 8-hour period. The stability was ascertained by taking numerous close-up photographs of the flame in the reactor showing a meter stick placed next to the reactor. To assure that there be no camera movement, the camera was mounted on a heavy tripod.

A wide range of experiments are possible. Since the cylinder and the outer jacket are transparent, spectroscopic study from the near UV to the near IR combustion over almost the entire length of the cylinder is possible. The two opposing ports allow absorption spectroscopy studies. A beam of electromagnetic energy is introduced through one port and is then able to exit through the other, whereupon it is analyzed. If sidearm windows with electrode attachments are used, the ions being generated by the combustion reaction may be measured by putting a potential between the electrodes and monitoring the current. Depending on the material and angle of the optical plate, almost any spectroscopic study at any wavelength may be undertaken. Also, if a sidearm window with a probe for adding material is selected, dopants may be added directly to any stage of combustion.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An apparatus for the study of combustion comprising:
   an upright hollow transparent cylinder having a restricted lower opening and a restricted upper opening;
   a chimney within said upper opening;
   an outer transparent jacket sealingly engaged to said cylinder thereby permitting the pressurization or evacuation between said cylinder and said jacket;
   an electrically conductive semi-transparent coating substantially covering said cylinder for resistive heating of said cylinder;

a first electrical contact on said cylinder above said lower opening whereby electrical contact is made with said coating;

a second electrical contact on said cylinder below said upper opening whereby electrical contact is made with said coating;

an inert retaining means located inside said cylinder and above said lower opening; and a quantity of porous inert material on said retaining means.

2. The apparatus of claim 1 which further comprises a heating means for said chimney.

3. The apparatus of claim 2 wherein said cylinder comprises a material selected from the group consisting of quartz glass and borosilicate glass:

said coating is a metal oxide;

said electrical contacts comprise a material selected from the group consisting of silver print paint and a metal having a high electrical conductivity in a nonpaint form and said inert porous material comprises glass beads.

4. The apparatus of claim 3 which further comprises means to determine the temperature within said cylinder.

5. The apparatus of claim 4 which further comprises at least one means for adding and extracting that extends from at least one end opening into said cylinder in coaxial alignment therewith.

6. The apparatus of claim 4 which further comprises a pressure altering means for said cylinder.

7. The apparatus of claim 4 wherein said cylinder has two opposing colinear ports and said outer jacket has two ports in optical alignment with said ports of said cylinder; and which further comprises a sidearm extending from each port of said cylinder to and beyond each port of said outer jacket and sealingly connecting with said cylinder and jacket, and a removable sidearm window on each of said sidearms.

8. The apparatus of claim 6 wherein said cylinder has a third port perpendicular to and in the same plane as the axis between said ports of said cylinder, and said outer jacket has a third port in optical alignment with said third port of said cylinder; and which further comprises a third sidearm extending from said third port of said cylinder to and beyond said third port of said outer jacket and sealingly connecting with said cylinder and jacket, and a sidearm window on said third sidearm.

9. The apparatus of claim 8 wherein said cylinder has a fourth port in optical alignment with said third port and said outer jacket has a fourth port in optical alignment with said fourth port of said cylinder; and which further comprises a fourth sidearm extending from said fourth cylinder port to and beyond said fourth outer jacket port and sealingly connecting with said cylinder and jacket, and a sidearm window on said fourth sidearm.

10. The apparatus of claim 9 wherein each of two opposing sidearm windows have electrodes extending toward the cavity of said cylinder.

11. The apparatus of claim 9 wherein at least one of said sidearm windows has a probing means.

12. The apparatus of claim 11 wherein said probing means is a probe for adding and extracting material.

* * * * *